(12) United States Patent
Choi

(10) Patent No.: US 9,802,647 B2
(45) Date of Patent: Oct. 31, 2017

(54) DEVICE FOR CONTROLLING STEERING WHEEL AND METHOD FOR CONTROLLING STEERING WHEEL USING SAME

(71) Applicant: DOOSAN CORPORATION, Jung-gu, Seoul (KR)

(72) Inventor: Sun Ho Choi, Seoul (KR)

(73) Assignee: DOOSAN CORPORATION, Seoul (KR)

( * ) Notice: Subject to any disclaimer, the term of this patent is extended or adjusted under 35 U.S.C. 154(b) by 0 days.

(21) Appl. No.: 14/915,823

(22) PCT Filed: Sep. 1, 2014

(86) PCT No.: PCT/KR2014/008158
§ 371 (c)(1),
(2) Date: Mar. 1, 2016

(87) PCT Pub. No.: WO2015/030559
PCT Pub. Date: Mar. 5, 2015

(65) Prior Publication Data
US 2016/0194028 A1 Jul. 7, 2016

(30) Foreign Application Priority Data

Sep. 2, 2013 (KR) ........................ 10-2013-0104756

(51) Int. Cl.
*B62D 15/00* (2006.01)
*B62D 15/02* (2006.01)
(Continued)

(52) U.S. Cl.
CPC ....... *B62D 15/0245* (2013.01); *B62D 5/0418* (2013.01); *B62D 6/00* (2013.01); *B62D 6/002* (2013.01)

(58) Field of Classification Search
None
See application file for complete search history.

(56) References Cited

U.S. PATENT DOCUMENTS

2010/0206647 A1* 8/2010 Ishii ....................... B60K 17/30
180/6.24
2013/0054074 A1* 2/2013 Schreiber ........... B62D 15/0245
701/23

FOREIGN PATENT DOCUMENTS

EP    1 447 306 A2    8/2004
EP    1 310 419 B1    8/2007
(Continued)

OTHER PUBLICATIONS

International Search Report dated in corresponding International Patent Application No. PCT/KR2014/008158 Dec. 17, 2014, consisting of 5 pp. (English Translation Provided).
(Continued)

*Primary Examiner* — Angela Ortiz
*Assistant Examiner* — Garrett Evans
(74) *Attorney, Agent, or Firm* — Volpe and Koenig, P.C.

(57) ABSTRACT

A device for controlling a steering wheel and a method for controlling a steering wheel using the same that includes: a detecting bar which is rotated in conjunction with a steering shaft of an industrial vehicle's steering wheel; a sensor at one side of the detecting bar so as to detect a steering angle of the steering wheel by means of the detecting bar; and a controller which controls the steering wheel based on a sensing signal of the sensor so as to position the steering wheel in a neutral position during a time when electric power is applied to the industrial vehicle and the industrial vehicle is initialized. When an operator turns on a power source of the electric forklift, the steering wheel is positioned in the neutral position to enable an operator to
(Continued)

immediately drive the electric forklift without confirming a position of the steering wheel.

7 Claims, 6 Drawing Sheets

(51) Int. Cl.
    *B62D 5/04*        (2006.01)
    *B62D 6/00*        (2006.01)

(56) References Cited

FOREIGN PATENT DOCUMENTS

| | | |
|---|---|---|
| EP | 2 289 766 A2 | 3/2011 |
| EP | 2 335 962 B1 | 12/2011 |
| JP | 2007106387 A | 4/2007 |
| KR | 1019970074489 A | 12/1997 |
| KR | 1019980030077 A | 7/1998 |
| KR | 1019990020718 A | 3/1999 |
| KR | 100804754 B1 | 2/2008 |
| KR | 1020110071973 A | 6/2011 |

OTHER PUBLICATIONS

Written Opinion dated in corresponding International Patent Application No. PCT/KR2014/008158 Dec. 17, 2014, consisting of 5 pp.
Search Report dated in corresponding European Application No. 14840285.2 Mar. 17, 2017, consisting of 7 pp.

\* cited by examiner

[Fig. 1]
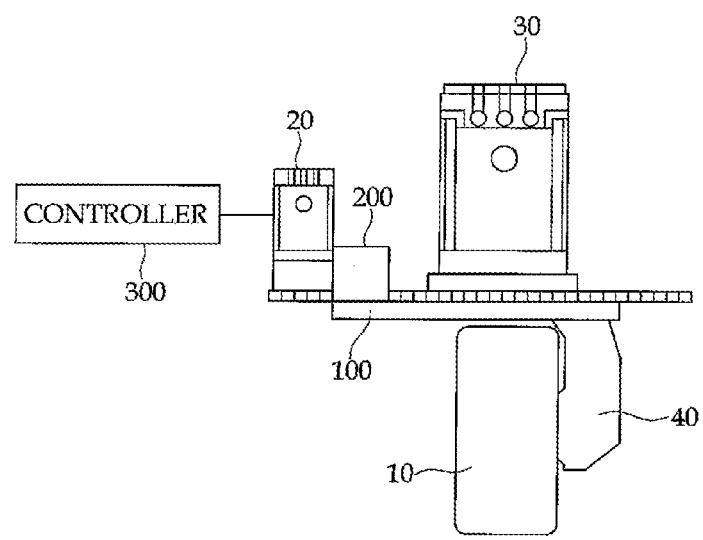
[Fig. 2]
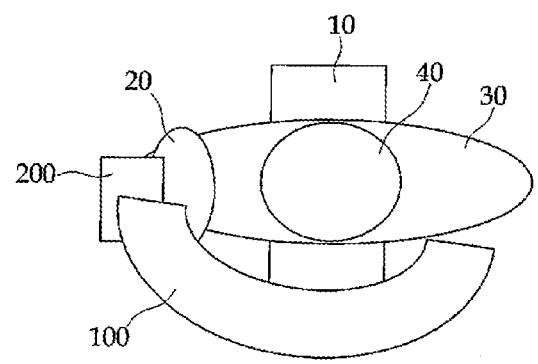

[Fig. 3]
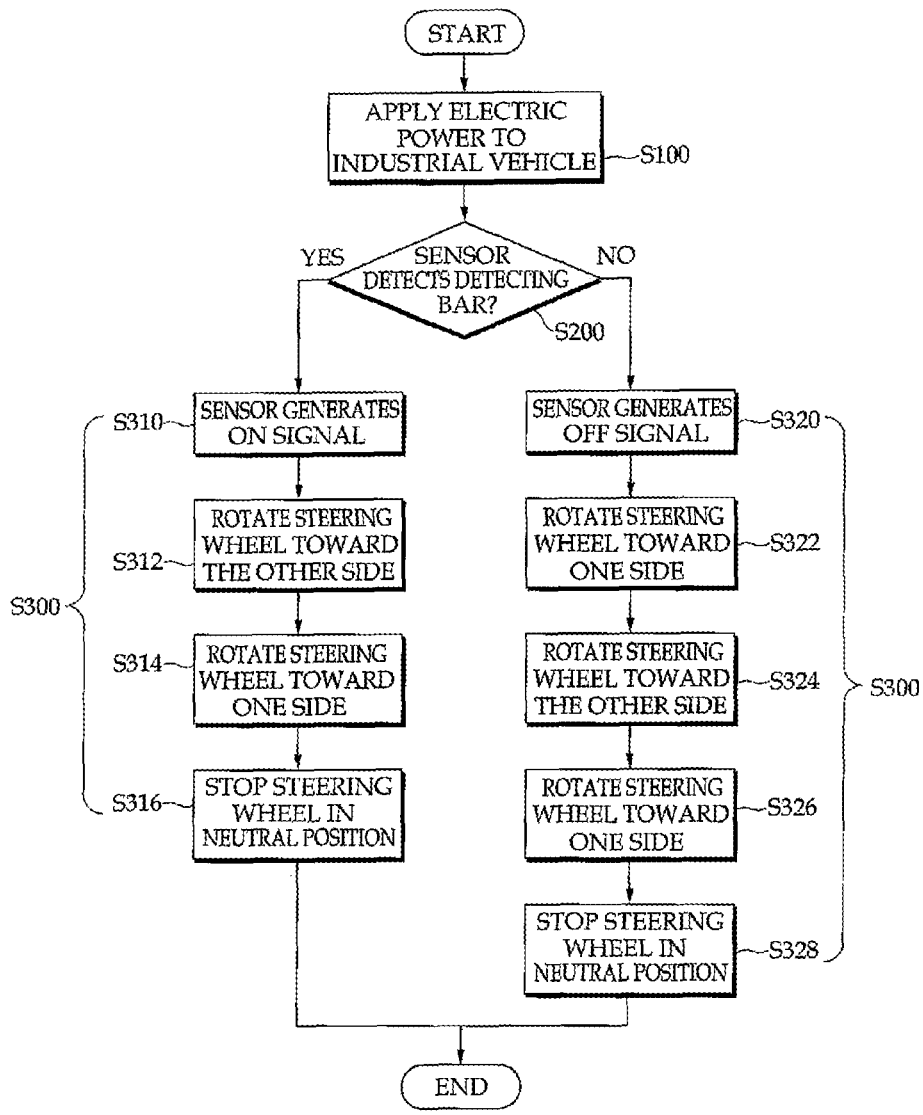

[Fig. 4]
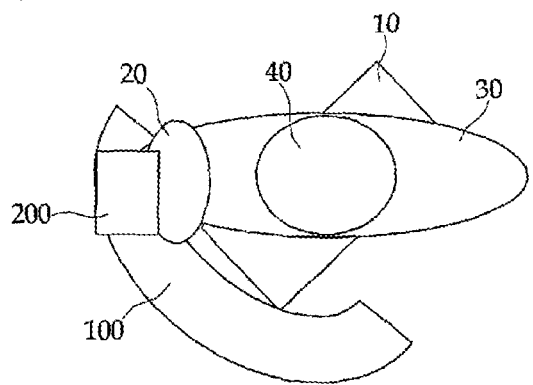
[Fig. 5]
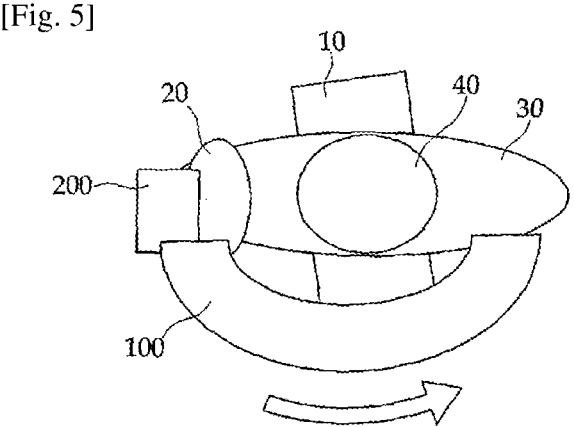

[Fig. 6]
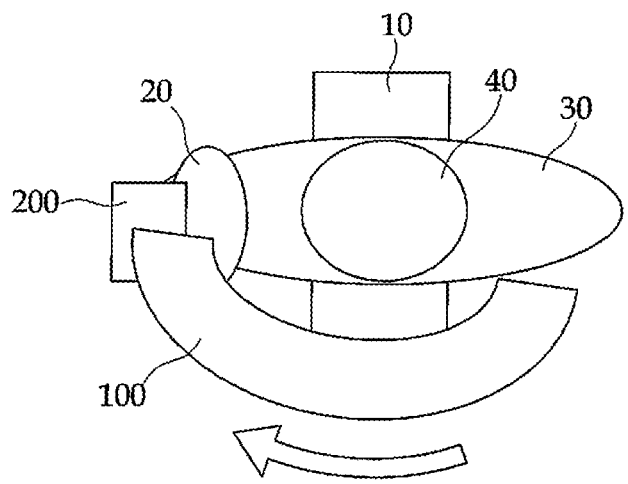
[Fig. 7]
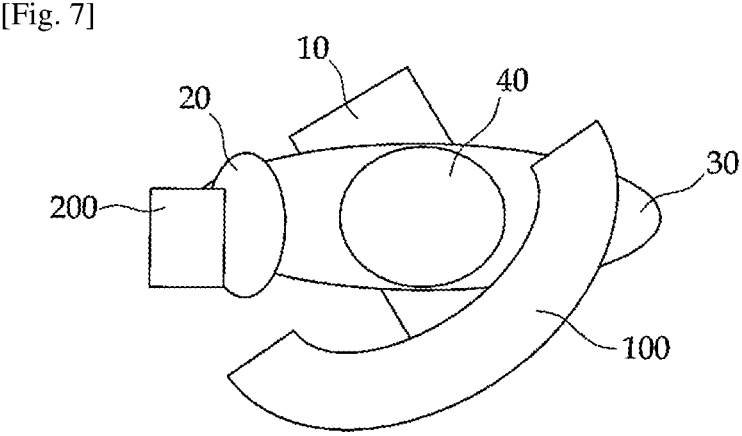

[Fig. 8]
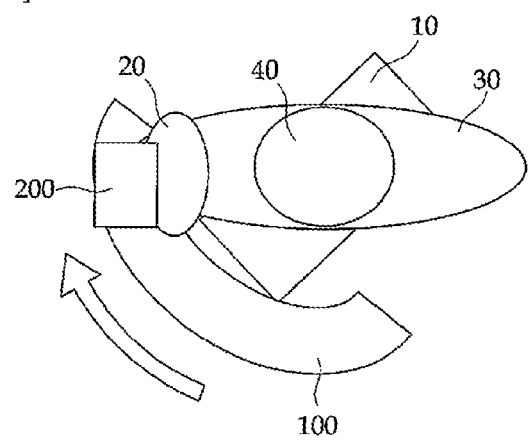
[Fig. 9]
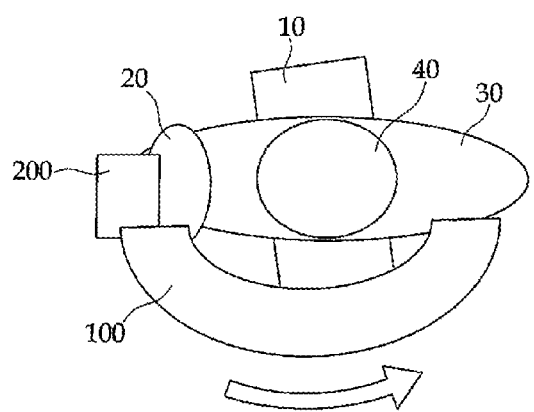

[Fig. 10]
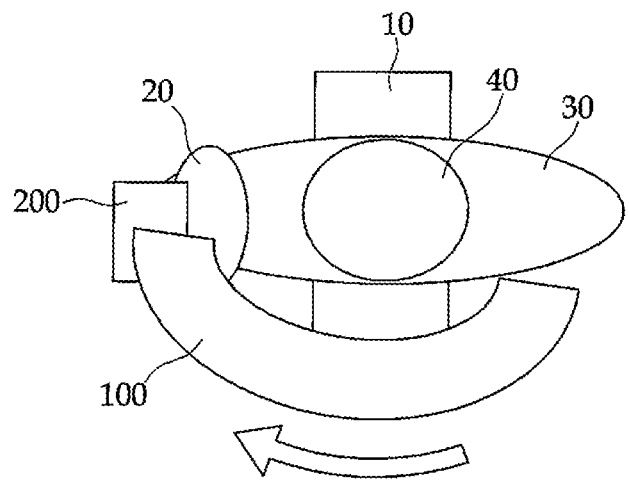

DEVICE FOR CONTROLLING STEERING WHEEL AND METHOD FOR CONTROLLING STEERING WHEEL USING SAME

TECHNICAL FIELD

The present disclosure relates to a device for controlling a steering wheel and a method for controlling a steering wheel using the same, which are applied to an industrial vehicle such as a forklift.

BACKGROUND ART

In general, forklifts as industrial vehicles are classified into an engine type forklift and an electric forklift. The engine type forklift refers to a forklift equipped with an engine and a fuel tank, and the engine type forklift drives a hydraulic pump through an output shaft of the engine, and performs work such as driving and steering the forklift and driving a working machine by using pressurized oil discharged from the hydraulic pump.

The electric forklift refers to a forklift in which an engine is omitted from the engine type forklift and a traveling motor, a hydraulic motor, and a battery are installed, and the electric forklift drives the traveling motor and the hydraulic motor by using the battery, and performs work such as driving and steering the forklift and driving a working machine by using pressurized oil discharged from a hydraulic pump driven by the corresponding motor.

Meanwhile, the steering system refers to a system that makes it possible to control and change a traveling direction of the vehicle, and transmits steering force generated by operating a steering handle to a wheel of the vehicle. An electronic power steering (EPS) system, among the steering systems, refers to a system in which a sensor detects a steering speed and a steering direction of the steering handle when the steering handle is operated, such that an electric motor is operated to control and change a traveling direction of the vehicle.

As an invention related to the steering system in the related art, Korean Patent Application Laid-Open No. 10-2011-0071973 (Title of the Invention: Apparatus and Method for Returning Forward Direction of Vehicle Steering Wheel) discloses a system that enables a driver to return a steering wheel in a forward direction only by manipulating a button.

In the case of the electric forklift having the EPS system in the related art, when the driver turns off a key switch after completing work and then turns on the key switch in order to perform work again, the steering wheel maintains a state when the key switch is turned off, and as a result, the driver is inconvenienced because the driver needs to confirm a position of the steering wheel, and then operate the steering handle so as to drive the forklift in an intended direction when the driver drives the forklift.

DISCLOSURE

Technical Problem

The present disclosure has been made in an effort to solve the aforementioned problem, and an object of the present disclosure is to provide a device for controlling a steering wheel and a method for controlling a steering wheel using the same, which change a position of a steering wheel to a neutral position during the time when a key switch of an electric forklift is turned on and then the electric forklift is initialized while electric power is applied to the electric forklift, in a case in which the steering wheel is positioned in a forward direction, that is, in a case in which the steering wheel is positioned in a left or right position instead of the neutral position when the key switch of the electric forklift is turned off, thereby reducing an inconvenience that occurs when an operator needs to confirm a position of the steering wheel so as to drive the electric forklift.

Technical problems to be solved by the present disclosure are not limited to the aforementioned technical problem, and other technical problems, which are not mentioned above, may be clearly understood from the following descriptions by those skilled in the art to which the present disclosure pertains.

Technical Solution

To achieve the aforementioned object, the present disclosure provides a device for controlling a steering wheel which is provided on at least one of the steering wheels of an industrial vehicle, the device including: a detecting bar which is rotated by being operated in conjunction with a steering shaft of the steering wheel; a sensor which is provided at one side of the detecting bar so as to detect a steering angle of the steering wheel by means of the detecting bar; and a controller which controls the steering wheel based on a sensing signal of the sensor so as to position the steering wheel in a neutral position during the time when electric power is applied to the industrial vehicle and the industrial vehicle is initialized.

In addition, the detecting bar may be disposed above the steering wheel, and curvedly formed in an arc shape so that one end portion of the detecting bar is detected by the sensor.

Meanwhile, to achieve the aforementioned object, the present disclosure provides a method for controlling a steering wheel, the method including: applying electric power to an industrial vehicle; detecting, by a sensor provided at one side of at least one of the steering wheels of the industrial vehicle, a detecting bar which is rotated by being operated in conjunction with a steering shaft of the steering wheel; and controlling, by a controller, the steering wheel based on a sensing signal of the sensor so as to position the steering wheel in a neutral position during the time when electric power is applied to the industrial vehicle and the industrial vehicle is initialized.

In addition, in the detecting of the detecting bar, when the sensor detects the detecting bar and generates an ON signal, the controlling of the steering wheel may include: rotating the steering wheel toward the other side so that the sensor does not detect the detecting bar and generates an OFF signal; rotating the steering wheel toward one side so that the sensor detects the detecting bar and generates the ON signal, when the sensor generates the OFF signal; and stopping and maintaining the steering wheel in the neutral position when the sensor generates the ON signal.

In addition, in the detecting of the detecting bar, when the sensor does not detect the detecting bar and generates an OFF signal, the controlling of the steering wheel may include: rotating the steering wheel toward one side so that the sensor detects the detecting bar and generates an ON signal; rotating the steering wheel toward the other side so that the sensor does not detect the detecting bar and generates the OFF signal, when the sensor generates the ON signal; rotating the steering wheel toward the one side so that the sensor detects the detecting bar and generates the ON signal, when the sensor generates the OFF signal; and stopping and maintaining the steering wheel in the neutral position when the sensor generates the ON signal.

Advantageous Effects

The present disclosure may improve convenience because when an operator turns on a power source of the electric forklift, the steering wheel is always positioned in the forward direction, that is, in the neutral position, thereby enabling the operator to immediately drive the electric forklift without confirming a position of the steering wheel.

DESCRIPTION OF DRAWINGS

FIG. 1 is a front view illustrating a device for controlling a steering wheel according to an exemplary embodiment of the present disclosure.

FIG. 2 is a top plan view illustrating the device for controlling the steering wheel according to the exemplary embodiment of the present disclosure.

FIG. 3 is a flowchart illustrating a method for controlling the steering wheel according to the exemplary embodiment of the present disclosure.

FIGS. 4 to 10 are top plan views illustrating operational states of the steering wheel according to the method for controlling the steering wheel according to the exemplary embodiment of the present disclosure.

DESCRIPTION OF MAIN REFERENCE NUMERALS OF DRAWINGS

10: Steering wheel
20: Steering motor
30: Traveling motor
100: Detecting bar
200: Sensor
300: Controller

BEST MODE

Hereinafter, an exemplary embodiment according to the present disclosure will be described in detail with reference to the accompanying drawings. Here, sizes, shapes, or the like of constituent elements may be exaggerated for clarity and convenience of description. In addition, terms, which are especially defined considering configurations and operations of the present disclosure, may vary depending on the intention or usual practice of a user or an operator. The definition of the terms should be made based on the entire contents of the present specification. Further, the spirit of the present disclosure is not limited to the disclosed exemplary embodiment, and those skilled in the art, who understand the spirit of the present disclosure, may easily carry out the other exemplary embodiments within a range of the same spirit, and the other exemplary embodiments are also of course belong to the scope of the present disclosure.

FIG. 1 is a front view illustrating a device for controlling a steering wheel according to an exemplary embodiment of the present disclosure, and FIG. 2 is a top plan view illustrating the device for controlling the steering wheel according to the exemplary embodiment of the present disclosure. A configuration of a device for controlling a steering wheel will be described in detail with reference to FIGS. 1 and 2.

As illustrated in FIGS. 1 and 2, in an industrial vehicle such as an electric forklift to which an EPS system according to an exemplary embodiment of the present disclosure is applied, a steering system may include an EPS motor which rotates a steering wheel 10 about a steering shaft 40, that is, the steering system may include a steering motor 20, and a traveling motor 30 for driving traveling wheels including the steering wheel 10.

In the steering system, the device for controlling the steering wheel enables the steering wheel to be always positioned in a forward direction, that is, positioned in a neutral position during the time when an operator turns on a power source of the industrial vehicle such as the electric forklift and then the industrial vehicle is initiated, thereby enabling the operator to immediately drive the industrial vehicle without confirming a position of the steering wheel, and the device for controlling the steering wheel is provided on at least one of the steering wheels of the industrial vehicle.

The device for controlling the steering wheel may include a detecting bar 100, a sensor 200, and a controller 300.

The detecting bar 100 is disposed above the steering wheel 10 and rotated by being operated in conjunction with the steering shaft 40 of the steering wheel 10. The detecting bar 100 may be curvedly formed in an arc shape so that one end portion of the detecting bar 100 is detected by the sensor 200 when the detecting bar 100 is rotated together with the steering shaft 40.

The sensor 200 may be provided at one side of the detecting bar 100 so as to detect a steering angle of the steering wheel 10 by means of the detecting bar 100.

That is, when the steering wheel 10 is rotated toward one side (in a left direction in FIG. 2), the detecting bar 100 is also rotated by the same rotation angle as the steering wheel 10 and detected by the sensor 200, and when the steering wheel 10 is rotated toward the other side (in a right direction in FIG. 2), the detecting bar 100 is also rotated by the same rotation angle as the steering wheel 10 such that the detecting bar 100 may not be detected by the sensor 200.

Therefore, depending on whether the detecting bar 100 is detected, the sensor 200 may detect the current steering angle of the steering wheel 10, that is, the sensor 200 may detect whether the steering wheel 10 has been rotated toward one side or the other side.

The controller 300 controls the steering wheel 10 based on a sensing signal of the sensor 200 so as to position the steering wheel 10 in the neutral position during the time when electric power is applied to the industrial vehicle and then the industrial vehicle is initialized.

The controller 300 controls the steering motor 20 that rotates the steering wheel 10 about the steering shaft 40, and when electric power is applied, the controller 300 allows the steering wheel 10 to be always positioned in the forward direction, that is, in the neutral position, and the method for controlling the steering wheel 10 will be described below.

FIG. 3 is a flowchart illustrating the method for controlling the steering wheel according to the exemplary embodiment of the present disclosure, and FIGS. 4 to 10 are top plan views illustrating operational states of the steering wheel according to the method for controlling the steering wheel according to the exemplary embodiment of the present disclosure. The method for controlling the steering wheel and an operation of the steering wheel according to the method will be described in detail with reference to FIGS. 3 to 10.

The method for controlling the steering wheel 10 using the device for controlling the steering wheel 10 may include an applying step S100, a detecting step S200, and a controlling step S300.

The applying step S100 is a step of applying electric power when the operator performs work by using the industrial vehicle such as the electric forklift, and a main controller (not illustrated) inspects the entire system of the vehicle, for example, for about 3 seconds after the key switch is turned on and electric power is applied.

Further, the detecting step S200 and the controlling step S300 are carried out for about 3 seconds which is the time for inspecting the system of the vehicle, and in the detecting step S200, the sensor 200, which is provided at one side of at least one of the steering wheels 10 of the industrial vehicle, detects the detecting bar 100 which is rotated by being operated in conjunction with the steering shaft 40 of the steering wheel 10.

When electric power is applied and the detecting bar 100 is rotated toward one side as described above, the sensor 200 detects the detecting bar 100 and generates an ON signal, and when the detecting bar 100 is rotated toward the other side, the sensor 200 does not detect the detecting bar 100 and generates an OFF signal.

In the controlling step S300, the controller 300 controls the steering wheel 10 based on the sensing signals, that is, ON/OFF signals of the sensor 200 so as to position the steering wheel 10 in the neutral position.

First, as illustrated in FIG. 4, when the sensor 200 detects the detecting bar 100, that is, in a case in which the steering wheel 10 remains rotated toward one side (a left side in FIG. 4) when electric power is applied, the sensor 200 generates the ON signal (S310).

In this case, the controller 300 drives the steering motor 20 and rotates the steering wheel 10 toward the other side as illustrated in FIG. 5, and the detecting bar 100 is also rotated toward the other side by being operated in conjunction with the steering wheel 10, such that the sensor 200 does not detect the detecting bar 100 and generates the OFF signal (S312).

Further, when the sensor 200 generates the OFF signal, the controller 300 immediately rotates the steering wheel 10 back to the one side, such that the sensor 200 detects the detecting bar 100 and generates the ON signal as illustrated in FIG. 6 (S314).

Lastly, when the sensor 200 generates the ON signal, the controller 300 immediately stops and controls the steering wheel 10 so that the steering wheel 10 is maintained in the forward direction, that is, in the neutral position (S316).

According to the control method when the steering wheel 10 has been rotated toward the one side when electric power is applied, the reason why the controller 300 does not stop the steering wheel 10 when the sensor 200 generates the OFF signal (S312), but rotates the steering wheel 10 toward the one side (S314) so that the sensor 200 generates the ON signal once more and then stops the steering wheel 10 is to maintain the steering wheel 10 in an accurate neutral position because a response speed at which the controller 300 rotates the steering wheel 10 as the sensor 200 detects the detecting bar 100 is comparatively high.

Meanwhile, as illustrated in FIG. 7, when the sensor 200 does not detect the detecting bar 100, that is, in a case in which the steering wheel 10 remains rotated toward the other side (a right side in FIG. 7) when electric power is applied, the sensor 200 generates the OFF signal (S320).

In this case, the controller 300 drives the steering motor 20 and rotates the steering wheel 10 toward the one side as illustrated in FIG. 8, and the detecting bar 100 is also rotated toward the one side by being operated in conjunction with the steering wheel 10, such that the sensor 200 detects the detecting bar 100 and generates the ON signal (S322).

Further, when the sensor 200 generates the ON signal, the controller 300 immediately rotates the steering wheel 10 back to the other side, such that the sensor 200 does not detect the detecting bar 100 and generates the OFF signal as illustrated in FIG. 9 (S324).

Further, when the sensor 200 generates the OFF signal, the controller 300 immediately rotates the steering wheel 10 back to the one side, such that the sensor 200 detects the detecting bar 100 and generates the ON signal as illustrated in FIG. 10 (S326).

Lastly, when the sensor 200 generates the ON signal, the controller 300 immediately stops and controls the steering wheel 10 so that the steering wheel 10 is maintained in the forward direction, that is, in the neutral position (S328).

According to the control method when steering wheel 10 has been rotated toward the other side when electric power is applied, the reason why the controller 300 does not stop the steering wheel 10 when the sensor 200 generates the ON signal or the OFF signal (S322 or S324), but rotates the steering wheel 10 toward the one side (S326) so that the sensor 200 generates the ON signal once more lastly and then stops the steering wheel 10 is to maintain the steering wheel 10 in an accurate neutral position because a response speed at which the controller 300 rotates the steering wheel 10 as the sensor 200 detects the detecting bar 100 is comparatively high, similar to the above description.

Consequently, in order to control and position the steering wheel 10 in the neutral position in both of the cases in which the steering wheel 10 remains rotated toward the one side and the other side when electric power is applied, a condition in which the sensor 200 detects the detecting bar 100 and generates the ON signal is defined as a final condition.

Meanwhile, in a case in which the steering wheel 10 is accurately maintained in the forward direction, that is, in the neutral position when electric power is applied, the sensor 200 may detect the detecting bar 100 and generate the ON signal, such that the steering wheel 10 may be controlled by a process identical to the process which is carried out when the steering wheel 10 has been rotated toward the one side.

While the exemplary embodiments of the present disclosure have been described above, the exemplary embodiments are described just for illustration, and those skilled in the art will understand that various modifications of the exemplary embodiments and any other exemplary embodiment equivalent thereto are available. Accordingly, the true technical protection scope of the present disclosure should be determined by the appended claims.

The invention claimed is:

1. A device for controlling a steering wheel which is provided on at least one of the steering wheels of an industrial vehicle, the device comprising:
    a detecting bar which is rotated by being operated in conjunction with a steering shaft of the steering wheel;
    a sensor which is provided at one side of the detecting bar so as to generate an ON signal when the steering wheel rotates to one side and generate an OFF signal when the steering wheel rotates to the other side based on the neutral state by means of the detecting bar; and
    a controller which controls the steering wheel based on a sensing signal of the sensor so as to position the steering wheel in a neutral position,
    wherein the controller controls the neutral state of the steering wheel by stopping the rotation of the steering wheel when an ON signal is generated after an OFF signal.

2. The device of claim 1, wherein the detecting bar is disposed above the steering wheel, and curvedly formed in an arc shape so that one end portion of the detecting bar is detected by the sensor.

3. A method for controlling a steering wheel, the method comprising:
applying electric power to an industrial vehicle;
detecting, by a sensor provided at one side of at least one of the steering wheels of the industrial vehicle, a detecting bar which is rotated by being operated in conjunction with a steering shaft of the steering wheel; and
controlling, by a controller, the steering wheel based on a sensing signal of the sensor so as to position the steering wheel in a neutral position when an ON signal is generated after an OFF signal.

4. The method of claim 3, wherein in the detecting of the detecting bar, when the sensor detects the detecting bar and generates a first ON signal, the controlling of the steering wheel includes:
rotating the steering wheel toward the other side so that the sensor does not detect the detecting bar and generates a first OFF signal;
rotating the steering wheel toward one side so that the sensor detects the detecting bar and generates a second ON signal, after generating the first OFF signal; and
stopping and maintaining the steering wheel in the neutral position when the sensor generates the second ON signal.

5. The method of claim 3, wherein in the detecting of the detecting bar, when the sensor does not detect the detecting bar and generates a first OFF signal, the controlling of the steering wheel includes:
rotating the steering wheel toward one side so that the sensor detects the detecting bar and generates a first ON signal;
rotating the steering wheel toward the other side so that the sensor does not detect the detecting bar and generates a second OFF signal, after generating the first ON signal;
rotating the steering wheel toward the one side so that the sensor detects the detecting bar and generates second ON signal, after generating the second OFF signal; and
stopping and maintaining the steering wheel in the neutral position when the sensor generates the second ON signal.

6. The device of claim 1, wherein the controller controls the steering in a neutral position wheel during the time when electric power is applied to the industrial vehicle and the industrial vehicle is initialized.

7. The method of claim 3, wherein in the controlling further includes the controller controlling the steering in a neutral position wheel during the time when electric power is applied to the industrial vehicle and the industrial vehicle is initialized.

* * * * *